United States Patent
Howell et al.

[11] 3,778,170
[45] Dec. 11, 1973

[54] BORESCOPE GUIDE TUBE

[75] Inventors: Charles B. Howell, Cincinnati; Richard E. Drew, Loveland, both of Ohio

[73] Assignee: General Electric Company, Cincinnati, Ohio

[22] Filed: Nov. 2, 1972

[21] Appl. No.: 303,198

[52] U.S. Cl. .............................................. 356/241
[51] Int. Cl. .......................................... G01n 21/16
[58] Field of Search ...................... 356/241; 350/11, 350/96; 73/116, 151

[56] References Cited
UNITED STATES PATENTS

| | | | |
|---|---|---|---|
| 3,434,775 | 3/1969 | Gosselin | 356/241 |
| 3,519,363 | 7/1970 | Ritcher et al. | 356/241 |
| 3,690,775 | 9/1972 | Cousins | 356/241 |

*Primary Examiner*—William L. Sikes
*Attorney*—Thomas J. Bird, Jr. et al.

[57] ABSTRACT

An inspection assembly for inspecting the interior of a gas turbine engine, or similar complicated structure, is shown to include a guide tube which is insertable through a number of aligned access ports in the engine. The guide tube is designed to direct the distal tip of a suitable inspection device, such as a fiber optic borescope, to appropriate internal areas for inspection. The tube includes a curved section, which is formed of material with a built-in "memory," i.e., will retain its initial curvature when in its free state, but also is sufficiently flexible to permit straightening such that extremely small access ports may be provided in the device being inspected. A novel method of using such apparatus is also disclosed.

10 Claims, 8 Drawing Figures

BORESCOPE GUIDE TUBE

BACKGROUND OF THE INVENTION

This invention relates generally to gas turbine engine inspection techniques and, more particularly, to improved borescope inspection techniques and apparatus for carrying out these improved techniques.

The invention herein described was made in the course of or under a contract, or a subcontract thereunder, with the United States Department of the Air Force.

Gas turbine engines are the primary source of power for modern-day aircraft. In addition, gas turbine engines are useful in many other applications, such as marine propulsion, oil or gas line pumping, electrical energy generation, and the like. No matter what the particular application of the engine is, each gas turbine engine will include a compressor for compressing air flowing therethrough, a combustion system in which the compressed air is mixed with high energy fuel and ignited to provide a high energy gas stream, and a turbine which is driven by the high energy gas stream and, in turn, drives the compressor.

One of the primary advances in the gas turbine engine industry in recent years has been the significant extension of life of the individual components of the engine. For example, many of the hot parts of the engine, i.e., the combustor dome, liners, and turbine components, were limited to 300 hours of operation just a few years ago. Advances in materials capabilities and cooling techniques now permit such hardware to be designed for 3,000 hours, or more of use.

With this significant increase in the life of the hot parts of the engine, however, the requirements for inspecting the hot parts have also increased. For example, an air cooled turbine blade is designed to operate in an environment in which the gas temperatures are potentially higher than the melting point of the blade metal. The cooling techniques associated with the blade, however, maintain the blade metal temperature at a desirable level. As is well known in the industry, these cooling techniques involve the delivery of cooling air to the interior of the blade and, in most cases, the use of this cooling air to form a film on the exterior surface of the blade. If the cooling passage of a single blade becomes blocked for any reason, this blade may run at a high enough temperature to cause damage to the blade itself. For this reason, the blades must be inspected at intervals which are shorter than the actual design life capabilities of the hardware.

The hot parts of the engine, however, are located inside a casing which surrounds the engine and, in the case of turbofan engines, are located inside two or more such casings. The ability to inspect the engine hot parts without disassembling the entire engine is a must in order to maintain the operating costs of the engine at an acceptable level. For this reason, it has become an acceptable practice in the industry to use X-ray techniques to inspect the hot parts through the casing or casings. Such techniques, however, may not be capable of providing the detailed inspection of individual components within the hot part section of the engine. In order to alleviate these problems, the use of borescopic inspection techniques is also becoming commonplace throughout the industry.

Borescopic inspection techniques involve the use of a borescope which is inserted into the hot parts section of the engine in such a manner as to provide a direct sighting of individual components located therein. In order to permit the borescope to be inserted into the desired viewing area, a number of borescope access ports are provided in the outer casing of the engine, all structural components located between the outer casing and the combustor, and also the combustor casing and liners. Since each of the above members forms a part of the flow path of the engine, the openings provided therein must normally be sealed when the borescope is removed and the engine is operating. Each of the borescope access ports therefore adds complexity and cost to the engine and it is desirable to minimize the number of required access ports. It is a necessity, however, to be able to view a major portion, if not the entire hot section of the engine with the borescope. When one recognizes the fact that most, if not all, of the controls and accessories of an engine are mounted directly to the outer casing of the engine, the ability to provide a large number of access ports is severely limited. This fact, in addition to the cost and complexity added by the borescope access ports, also necessitates that the number of ports be minimized.

The problems are further complicated in that the two critical areas of the hot parts section are the turbine components and the fuel injection components, i.e., parts at opposite ends of the hot parts section of the engine. For the reasons enumerated above, it is desirable to provide a system in which both of these sections may be viewed with a single borescope. This requirement is not easily achieved due to the fact that the combustor liners of many engines are contoured to provide an outlet at a much larger radius than that of the inlet.

SUMMARY OF THE INVENTION

It is an object of the present invention to alleviate the above mentioned problems associated with prior borescopic inspection devices for gas turbine engines.

It is a further object of this invention to provide a borescopic inspection device which is capable of viewing a major portion of the hot parts section of an engine with a minimum number of access ports.

It is an additional object of this invention to provide such an inspection system which is capable of viewing the combustor dome and fuel injection hardware and the turbine components from a single borescope access port.

It is also an object of this invention to provide a method of inspecting the interior of a gas turbine engine, or similar device, with the inventive apparatus disclosed herein.

Briefly stated, the above and similarly related objects are attained in the present instance by providing a borescopic inspection assembly which includes a flexible fiber optic borescope and a contoured borescope guide tube which directs the borescope to the desired viewing areas within the hot parts section of an engine. The borescope guide tube is preformed of a semi-rigid plastic material which, in its free state, would have a natural curvature associated therewith. The tubing is designed with an internal diameter large enough to carry the flexible fiber optic scope, and the curvature is designed into the tubing to direct the distal tip of the borescope to a desired viewing sight. The guide tube is initially straightened by insertion of a rigid, straight rod internally of the tubing, and the straightened rod is inserted through a borescope access port into the combustion area. The straight rod is then removed and the tubing will form a curve in its free state. The flexible fiber optic scope is then inserted in the tubing. If required, a second guide tube provided with different curvature, may be inserted into the same access port in order to view different areas of the hot parts section of the engine.

DESCRIPTION OF THE DRAWINGS

While the specification concludes with a series of claims which distinctly claim and particularly point out the subject matter which Applicants regard to be their invention, a clear understanding of the invention will be had from the present description thereof, which is given in connection with the accompanying drawings in which:

DESCRIPTION OF A PREFERRED EMBODIMENT

Figure 1:
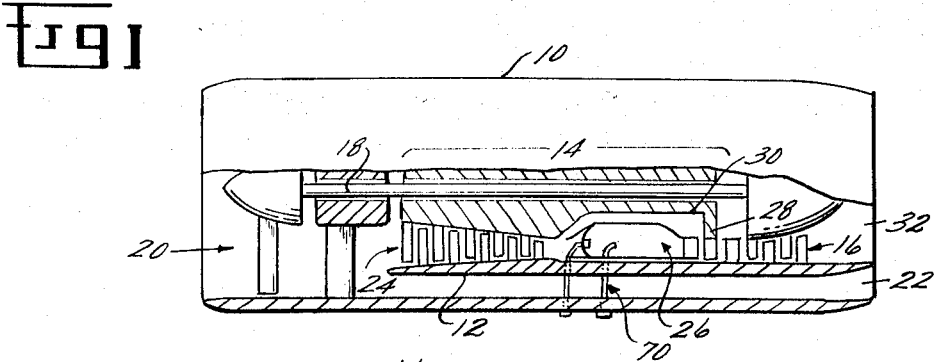
FIG. 1 is a schematic cross-sectional view of a gas turbine engine to which the present inventive device may be applied.

Referring now to the drawings wherein like numerals correspond to like elements throughout, FIG. 1 illustrates, in simplified form, a turbofan engine which is capable of use in the propulsion of aircraft. This engine comprises an outer casing or duct wall 10 and an inner duct wall 12. A core engine 14 disposed within the duct wall 12 generates a hot gas stream for driving a fan turbine 16. This turbine is connected by a shaft 18 to a bladed rotor or fan 20 which pressurizes an airstream. The outer annular portion of this airstream passes between the duct walls 10 and 12 and is discharged from a propulsive nozzle 22 to provide a propulsive force. The inner portion of the airstream, pressurized by the fan 20, is further pressurized by a compressor 24 of the core engine 14 to support combustion of fuel in a core engine combustor 26. The hot gas stream then drives a core engine turbine 28 connected through a shaft 30 to the core engine compressor 24. After driving the turbine 28, the hot gas stream then drives the fan turbine 16, as previously described, and is discharged through a propulsive nozzle 32.

The present invention is directed to means for inspecting components of the engine shown in FIG. 1, and in particular components located in the hot parts section of the engine. That is, the present invention is directed primarily to inspecting apparatus for inspecting the core engine combustor 26 and the turbine 28, which is located immediately downstream of the combustor 26. The invention could also be applied, however, to the inspection of compressor blading or other apparatus having an external casing and a complicated structural interior, which requires periodic inspection.

Figure 2:
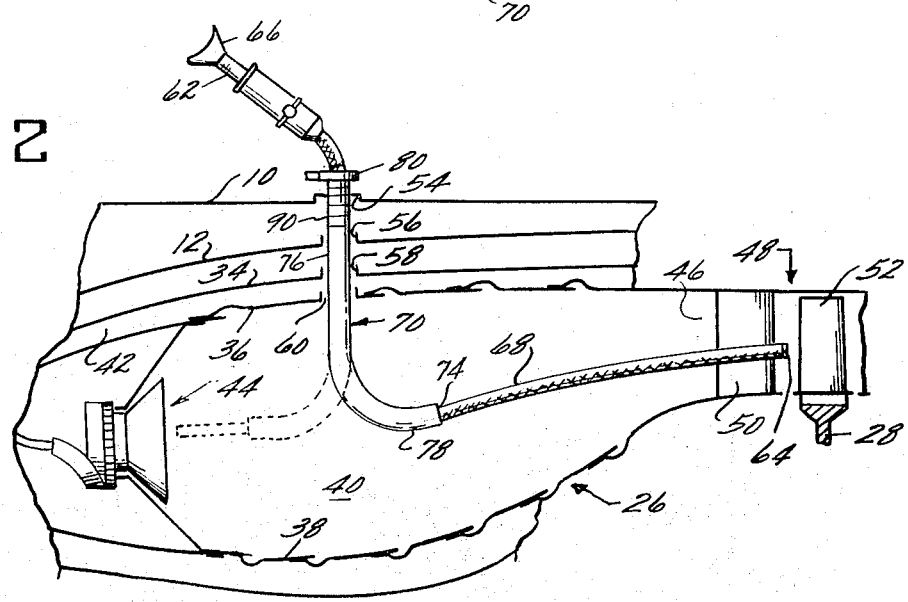
FIG. 2 is an enlarged, cross-sectional view of a portion of FIG. 1, with the borescope inspecting assembly inserted therein.

As shown most clearly in FIG. 2, the combustor 26 is located internally of the outer casing 10 and the core engine casing 12 and is also surrounded by a combustor casing 34 which is located internally of the core engine casing 12. The combustor 26 includes a pair of combustor liners 36 and 38 which define an annular combustion zone 40. The outer liner 36 is spaced from the combustor casing 34 to form a coolant flow path 42 around the combustor. The combustor 26 further includes a plurality of fuel/air carbureting devices, generally designated by the numeral 44, which are equally spaced around the circumference of the combustor.

It should be pointed out that the details of the combustor and the surrounding casing form no portion of the present invention. The above description is given solely to place the invention in proper perspective and to describe the requirements for any proper inspecting apparatus. The details of the combustor 26 could therefore completely change without detracting from the broad aspects of the present invention.

Figure 3:
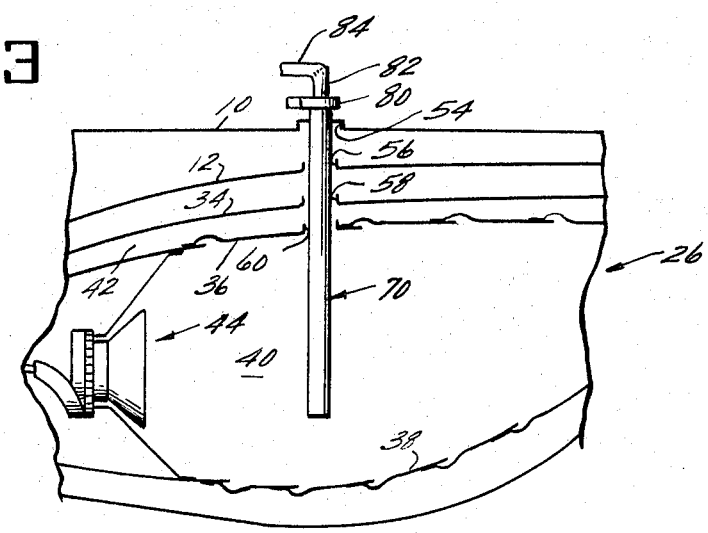
FIG. 3 is a cross-sectional view similar to FIG. 2 showing the insertion of the borescope guide tube.
Figure 4:
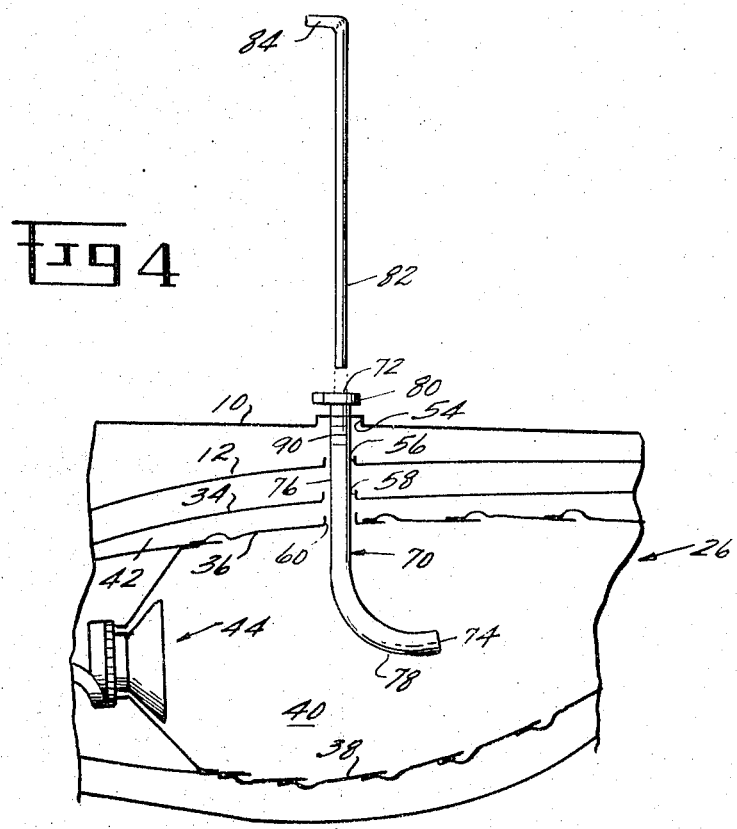
FIG. 4 is a cross-sectional view similar to FIG. 2 showing the borescope guide tube in place.

As further shown in FIGS. 2 through 4, the combustor liners 36 and 38 are contoured to form a combustor exit 46 immediately upstream of a stationary turbine nozzle 48, which comprises a cascade of stationary airfoil-shaped vanes 50. Located immediately downstream of the turbine nozzle 48 is the core engine turbine 28 which includes a plurality of rotating turbine blades 52 as is well known in the art.

As previously described, gas turbine engine users must be able to periodically inspect the internal components of the engine without disassembling the engine. For this reason, a borescope access port 54 is provided in the engine casing 10 at various locations around the perimeter of the casing 10. Similarly, access ports 56, 58 and 60 must be located within the core engine casing 12, the combustor casing 34 and the combustor outer lining 36, respectively. The access ports 54, 56, 58 and 60 are aligned such that a suitable inspecting device may be inserted into the combustor 26 to allow inspection thereof. As also previously mentioned, there are a number of critical areas in the hot parts section of the engine which must be inspected periodically. One of the areas is the upstream or dome portion of the combustor 26 and its associated fuel/air carbureting devices 44. Another critical area is the core engine turbine 28 and its associated blading 50 and 52. The combustor liners 36 and 38 must also be inspected, and any suitable inspection technique must be capable of inspecting all of these critical components through a minimum number of access ports.

At least some of the access ports 54, 56, 58 and 60 are located in structural members which form portions of the flow path of the engine. Therefore, when the inspecting device is removed form the engine each of the access ports must be sealed in some suitable manner in order to minimize the gas flow therethrough during normal operation of the engine. While the method of sealing the individual access ports 54 through 60 constitutes no portion of the present invention, it must be obvious to those skilled in the art that any sealing method adds complexity to the engine. It is therefore an absolute necessity that each set of access ports 54 through 60 provide the capability of inspecting a significant portion of the hot parts section of the engine. Needless to say, it is extremely desirable that each set of access ports permit inspection of not only the upstream or dome portion of the combustor but of also the turbine components located in some large sector of the engine.

One common inspection device which is utilized in connection with the access ports 54 through 60 is a fiber optic borescope, one of which is shown schematically in FIG. 2 and enumerated with the numeral 62. The actual construction of the borescope 62 does not form an inherent portion of the present invention. The borescope 62 includes a distal tip 64 and a sight tube 66 which are joined by means of a flexible conduit 68. The conduit 68 carries the desired optics and lighting system which enables an operator to view a region surrounding the distal tip 64 through the sight tube 66.

The conduit 68 is extremely flexible and is capable of being positioned at various locations within the engine combustor 26 when the borescope 62 is inserted through the various access ports 54 through 60. Some means is required, however, to control the actual position of the flexible conduit 68 and, especially, the distal tip 64 so that an operator can easily view all desired locations within the combustor 26 and the turbine 28. For this reason, and as clearly shown in FIGS. 2 through 4, the borescope 62 is provided with a borescope guide tube 70. The guide tube 70 is formed of a semi-rigid plastic material, which material is characterized by the fact that it has a built-in memory. That is, the material can be formed with a desired curvature and is flexible enough thereafter to be straightened, but will snap back to the initial curvature when permitted to exist in its free state. Many such types of material exist in the industry, and as an example, the tube 70 may be formed of urethane.

The tube 70 is designed to include an inlet 72 and an outlet 74, each of which are formed of a sufficient size so as to accept the borescope 62 therein. That is, the internal diameter of the tube 70 is sized such that the borescope 62 will fit therein.

As further shown in the drawings, the tube 70 is designed to include a straight section 76 and a curved end 78. Furthermore, the outside diameter of the tube 70 is sized so as to permit insertion of the tube, when the tube is straightened in a manner to be described hereafter, through the various access ports 54 through 60. As clearly shown in FIGS. 2 through 4, the straight section 76 of the tube 70 is formed of sufficient length so as to extend from the outside of the engine casing 10 into the combustion zone 40 when inserted through the various access ports. In one desired configuration, the tube 70 is formed of urethane using 100 durometer material for the straight section 76 and 95 durometer material for the curved end 78. The harder material in the straight section 76 adds stiffness and durability to the tube. If desired, and as further shown in the Figures, the tube may be provided with an enlarged knob end 80 which is sized so as to preclude insertion through the access port 54. The knob end 80 provides the further function of an enlarged handle which permits easy rotation of the tube 70 when the tube is inserted in the access ports. The knob can be provided with a feature in the form of an embossed arrow or a projection 81 to identify the direction the curved end is pointed when inside the engine.

The curved end portion 78 of the guide tube 70 is designed to direct the borescope distal tip 64 and flexible cable 68 to the desired locations within the combustor 26 and the turbine 28, with two such positions being shown in FIG. 2. In the solid line position shown therein, the curved portion 78 has directed the distal tube tip 64 toward the stator vanes 50 and turbine rotor blades 52, thereby permitting detailed inspection of these critical components. As is obvious from a review of the above description, the fuel/air carbureting devices 44 and the dome portion of the combustor could readily be inspected merely by partially withdrawing the borescope 62 such that the distal tip 64 lies closer to the outlet 74 of the guide tube 70 and thereafter rotating the guide tube 70 approximately 180°. In this manner, the tube 70 lies in the dotted line position and the distal tip 64 is directed at the dome portion of the combustor 26, another critical area of the engine.

Referring still to FIG. 2, it is readily apparent that a rigid guide tube formed with a curved end of the same shape and size as the curved end 78 of the guide tube 70 could be inserted into the combustor 26 merely by providing enlarged access ports through each structural member of the engine. However, it should be readily apparent that the smaller the access ports 54 through 60 can be made, the more practical the design will be. That is, the smaller the access ports can be made, the easier it would be to reseal the ports when the inspecting device is removed therefrom and the engine is made ready for normal operation. In some instances, if the access ports can be made small enough, the degree of leakage therethrough may be insignificant and the requirement for sealing such ports may be eliminated. In addition, the access ports take up areas of the outer casing upon which controls and accessories and/or external tubing must be mounted. Therefore, it is extremely desirable that the access ports 54 through 60 be made as small as possible.

As shown in FIGS. 2 – 4, the access ports 54 through 60 may be made of a size just slightly larger than the outer diameter of the guide tube 70 in the present instance. This is possible because the guide tube 70 is straightened prior to its insertion through the access ports 54 through 60. As shown most clearly in FIG. 4, means for straightening the guide tube 70 are provided in the form of a rigid rod 82 having an outer diameter just slightly smaller than the inner diameter of the guide tube 70. The rod 82 is inserted through the inlet 72 of the guide tube 70 and the rod 82 is formed of sufficient length so as to extend through the curved end portion 78 when it is inserted through the guide tube 70. In this manner, the rod 82 will straighten the curved end portion 78 to the configuration shown in FIG. 3 thereby enabling easy insertion of the guide tube 70 and the rod 82 through the access ports 54 through 60. If desired, the rod 82 may be provided with a curved handle portion 84 to simplify handling. Once the guide tube 70 is inserted through the innermost access port 60, the rod 82 may be removed from the guide tube 70. The guide tube 70, due to its construction will then snap back to its normal free state wherein the curved end 78 lies entirely within the combustion chamber 40 as shown in FIG. 4. Thereafter, the borescope 62 may be inserted through the inlet 72 into the combustion chamber and the guide tube 70 may be rotated in either direction by means of the handle 80. In this manner, a large portion of the hot parts section of the engine may be inspected by means of a single set of access ports 54 through 60. When the inspection process is over, the insertion procedure is merely reversed and the guide tube 70 may be removed from the access ports.

The curved shape of the guide tube 70 shown in FIGS. 2 through 4 is merely meant to be illustrative of one of many possible curvatures. For example, FIGS.

Figures 5, 6:
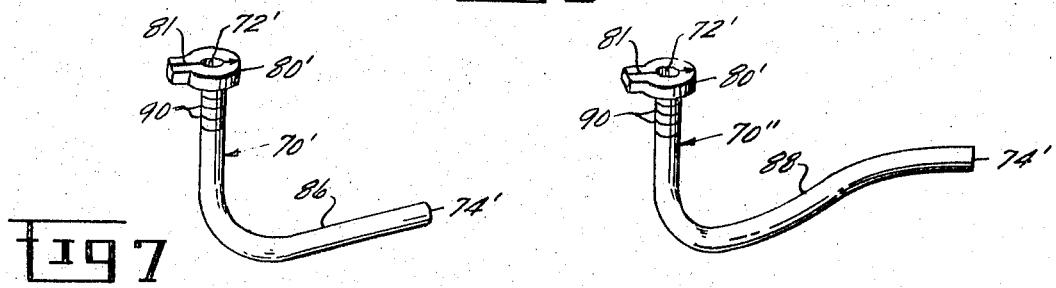
FIGS. 5 and 6 are perspective views of typical guide tubes constructed in accordance with the present invention.

5 and 6 illustrate alternative curvatures which could be designed into the guide tube 70 to enable inspection of various aspects of the engine. For example, in many modern-day engines, the combustor is designed to have an axial length of significant dimension. In such a case, a guide tube 70' could be constructed as shown in FIG. 5 wherein a curved end portion 86 would be provided with a contour similar to that of the inner combustor liner and sufficient length such that when the guide tube was inserted into the combustion zone the curved portion 86 thereof would readily guide the distal tip of the borescope to the turbine area. As another example, a guide tube 70'' could be constructed as shown in FIG. 6 wherein a curved end portion 88 is provided with reverse curvature, i.e., an "S" shaped curve, in order to guide the distal tip of the borescope to the turbine area in an application where the combustor liners are of extreme curvature. By providing the reverse curvature, the distal tip of the borescope could be directed axially through the stationary turbine vanes to the area of the rotating turbine blades after being directed through the curved combustion zone. As also shown in FIGS. 5 and 6, the straight section of the guide tube 70' and 70'' may be marked with indicia lines 90 to inform an operator of the correct insertion point for viewing certain areas of the engine.

In certain applications, it may be found desirable to utilize more than one shape of guide tube for each set of access ports. For example, a guide tube similar to the guide tube 70 with its curved end 78 could be utilized to inspect the dome portion and fuel/air carbureting devices 44 of the engine. A second guide tube similar to either that shown in FIG. 5 or FIG. 6 could be inserted through the same set of access ports, after the guide tube 70 is removed, in order to provide a suitable guide for the borescope to the turbine area of the engine. Applicants' inventive method and inspection apparatus are intended to cover these and similar variations of the broader inventive concepts described herein.

Figures 7, 8:
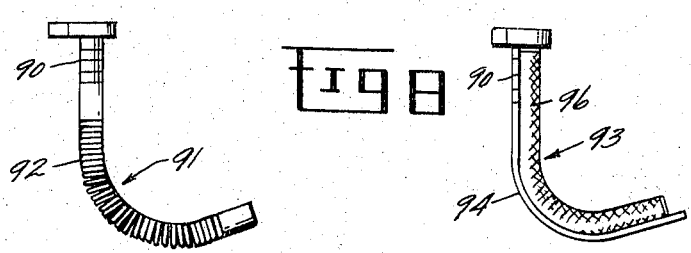
FIGS. 7 and 8 are perspective views of alternative embodiments.

Certain modifications of the present invention will undoubtedly occur to those skilled in the art. For example, it is not necessary that the guide tube be formed of plastic material. As shown in FIG. 7, tube 91 could be formed of a coiled spring 92 designed to have a memory. That is, the coiled spring 92 would be designed to provide the normal curvature in its free state as shown in FIG. 7, but would be flexible enough to permit straightening for insertion into the engine. Or, as shown in FIG. 8, a tube 93 could be formed of a leaf spring 94 having the desired curvature and flexibility. Means for holding the borescope such as cloth tubing 96, or brackets (not shown), would be attached to the spring 94. The appended claims are intended to cover these and similar modifications of applicant' inventive concept.

What we claim is:

1. An inspection device for an apparatus like a gas turbine engine, said device comprising:
   a hollow guide tube having an outer diameter and an inner diameter, said inner diameter being sized so as to accept a suitable inspecting apparatus,
   said tube including a first, generally straight portion adapted to extend from a first area easily accessible to an operator to a second area internal of the apparatus being inspected,
   directing means associated with said tube for directing a distal portion of the inspecting apparatus to an appropriate area to be inspected, said directing means being characterized by the fact that said means have a memory and sufficient flexibility whereby said directing means may be readily straightened for insertion from said first area to said second area and said directing means will return to its initial configuration upon reaching said second area.

2. An inspection device as recited in claim 1 wherein said directing means comprise a curved portion of tubing, said curved portion extending from one end of said straight portion of said guide tube.

3. An inspection device as recited in claim 2 in combination with means for straightening said curved portion, said straightening means comprising a rigid rod having an outer diameter adapted to fit within said inner diameter of said tube.

4. An inspection device as recited in claim 2 wherein said tube is formed of urethane.

5. An inspection device as recited in claim 4 further characterized in that said curved portion includes at least two bends.

6. An inspection device as recited in claim 1 wherein said directing means comprise a coiled spring.

7. An inspection device as recited in claim 1 wherein said directing means comprise a leaf spring.

8. A method of inspecting internal components of gas turbine engines or similar apparatus, said method comprising the steps of:
   inserting straightening means inside a curved guide tube;
   inserting the straightened guide tube through access ports in the apparatus being inspected,
   removing the straightening means from the guide tube thereby enabling said guide tube to assume its initial curved configuration, and
   inserting a suitable inspecting device into the guide tube and inspecting the internal components.

9. The method recited in claim 8 including the further step of rotating the guide tube and the inspecting device.

10. The method recited in claim 8 including the further steps of removing the inspecting device, reinserting the straightening means and removing ghe straightened guide tube from the access ports,
    inserting through the same access ports a second guide tube having a curvature different from the curvature of the first guide tube, reinserting the inspecting device, and inspecting other internal components.

* * * * *